United States Patent [19]

Croft et al.

[11] Patent Number: 5,205,971
[45] Date of Patent: Apr. 27, 1993

[54] MANUFACTURE OF NON-WHITEWARE CERAMIC ARTICLES

[75] Inventors: Alan P. Croft, Lake Jackson; Brian D. Koblinski, Missouri City, both of Tex.

[73] Assignee: The Dow Chemical Company, Midland, Mich.

[21] Appl. No.: 591,914

[22] Filed: Oct. 2, 1990

Related U.S. Application Data

[63] Continuation-in-part of Ser. No. 202,626, Jun. 6, 1988, abandoned.

[51] Int. Cl.$^5$ .................. C04B 35/10; C04B 35/48; C04B 35/56; C04B 35/58
[52] U.S. Cl. .................. 264/86; 106/287.3; 264/63; 264/109; 264/211.11; 264/328.2; 264/301; 524/252; 524/253; 524/408; 524/413; 524/424; 524/428; 501/1
[58] Field of Search .................. 106/287.3; 501/1; 264/63, , 86, 109, 211.11, 328.2, 301; 524/252, 253, 408, 413, 424, 428

[56] References Cited

U.S. PATENT DOCUMENTS

| | | | |
|---|---|---|---|
| 2,652,354 | 9/1953 | Dryden et al. | 264/63 |
| 3,102,102 | 8/1963 | Weidner et al. | 524/252 |
| 3,213,166 | 10/1965 | Dreyling et al. | 264/44 |
| 3,226,784 | 1/1966 | Owen et al. | 22/193 |
| 3,320,200 | 5/1967 | Kane | 524/252 |
| 3,396,775 | 8/1968 | Scott | 164/26 |
| 3,399,067 | 8/1968 | Scott | 106/38.3 |
| 3,418,401 | 12/1968 | Henry et al. | 264/86 |
| 3,472,803 | 10/1969 | Andrews et al. | 260/17 |
| 3,507,944 | 4/1970 | Moore, Jr. | 264/109 |
| 3,582,517 | 6/1971 | Bailey, Jr. et al. | 260/37 EP |
| 3,632,709 | 1/1972 | Hayes et al. | 264/63 |
| 3,652,749 | 3/1972 | Sobel et al. | 264/63 |
| 3,814,782 | 6/1974 | Hayes et al. | 264/63 |
| 4,025,350 | 5/1977 | Walters et al. | 106/38.35 |
| 4,040,998 | 8/1977 | Nemeth | 106/73.4 |
| 4,124,667 | 11/1978 | Coppola et al. | 264/86 |
| 4,209,056 | 6/1980 | Gardikes et al. | 106/38.3 |
| 4,482,388 | 11/1984 | Crosbie | 524/789 |
| 4,915,890 | 4/1990 | Koblinski | 264/86 |

*Primary Examiner*—James Derrington

[57] ABSTRACT

Non-whiteware ceramic articles having an increased green strength are prepared from slip compositions containing a polyalkylene polyamine as an additive or a mixture of a polyalkylene polyamine and binder as an additive. An example of such an additive is tetraethylenepentamine or a mixture of tetraethylenepentamine and a styrene butadiene latex.

21 Claims, No Drawings

MANUFACTURE OF NON-WHITEWARE CERAMIC ARTICLES

CROSS REFERENCE TO RELATED APPLICATIONS

This is a continuation-in-part of co-pending Ser. No. 202,626, filed Jun. 6, 1988, now abandoned.

BACKGROUND OF THE INVENTION

The present invention relates to the preparation of non-whiteware ceramic articles.

Ceramic articles are generally manufactured by processes involving pressing, casting or plastic-forming. Examples of pressing include uniaxial pressing, isostatic pressing, dry pressing, hot uniaxial pressing, hot isostatic pressing and hot dry pressing. Examples of casing include slip casting, drain casting, tape casting, thixotropic casting, pressure casting and soluble casting. Examples of plastic-forming methods include extrusion, injection molding, transfer molding and compression molding.

One example of a manufacturing method, slip casting, is a well-known and ancient process by which ceramic articles are prepared. In this method, the particulate matter is suspended in a slip medium, often water, to form a slip. The slip is poured into a mold and a portion of the slip medium is drawn out of the casting slip through the mold leaving a cast behind in the mold. The mold and cast are then separated and the cast article is processed to give it the final properties desired. Slip casting is employed in the manufacture of a wide variety of products, both whiteware and non-whiteware, ranging from sanitary ware to laboratory ware to electronic ceramics.

Dry pressing is also a well-known practice by which ceramic articles are prepared. In dry pressing, a particulate material is suspended in a slip medium, generally with other additives selected to control both the properties of the slip and the article ultimately prepared from the slip. The solvent is removed to prepare a powder having particles of the desired size or range of sizes. This powder is then placed into dies having the desired shape and pressure is applied to form the green ceramic article which undergoes additional processing. The pressure involved in dry pressing is applied either unilaterally as in dry pressing or from all directions as in isostatic dry pressing. Pressing operations may be carried out at various temperatures including room temperature or elevated temperatures.

Extrusion is another well-known process for the formation of ceramic articles. In a typical extrusion process, a ceramic powder is moistened and then kneaded or pugged until it forms a plastic mass which is extruded through a die to form the green ceramic article which then undergoes additional processing.

A major problem experienced in the preparation of non-whiteware ceramic articles by any of the methods known in the art as identified or described above is low green strength. Low green strength of articles is detrimental due to the breakage of articles during processing.

What is needed is an additive, useful in casting, pressing and plastic-forming processes for the manufacture of non-whiteware ceramic articles that results in increased green strength of the articles produced and that does not adversely impact other properties of the articles or the slip from which they are prepared.

SUMMARY OF THE INVENTION

In one aspect, the present invention is a process for the preparation of non-whiteware ceramic articles employing such an additive, the process comprising preparing a slip, essentially free of added elemental sulfur, which comprises a slip medium, a dispersant, a particulate material and a polyalkylene polyamine and using conventional casting, pressing or plastic forming ceramic processing to prepare non-whiteware articles from the slip composition.

The invention also includes a slip composition, which is essentially free of added elemental sulfur, from which non-whiteware ceramic articles can be prepared, said slip comprising:

(1) a slip medium;
(2) a dispersant;
(3) a particulate material; and
(4) an additive consisting of a polyalkylene polyamine having an average molecular weight of less than about 1,000 in an amount effective to increase the green strength of the non-whiteware ceramic articles prepared from the slip composition.

The polyalkylene polyamine additive in the slip composition may also include a binder mixed with the polyamine prior to its addition to the slip composition. When used in this way, the binder is added in an amount sufficient to maintain the viscosity and the cast weight of articles prepared from the slip composition.

In addition, the slip composition may also include other additives such as additional binders and pH regulators in addition to the binder mixed with the polyalkylene polyamine.

Surprisingly, the use of a polyalkylene polyamine slip casting additive in a slip composition useful for the preparation of non-whiteware ceramic articles and having a low green strength results in a processed article with improved green strength.

DETAILED DESCRIPTION OF THE INVENTION

The process of the present invention advantageously employs a particulate material, a slip medium, a dispersant, a polyalkylene polyamine and, optionally, a binder or mixture of binders for use in a method to prepare non-whiteware ceramic articles.

For purposes of this invention, the terms "slip" and "slip composition" include the slips or slip compositions useful in slip casting; slurries or suspensions from which powders are made for use in pressing; and the slurries or powders which are used in plastic-forming processes such as extrusion. Non-whiteware ceramic articles are ceramic articles other than those classified as whiteware which are pottery, porcelain and similar fine-grained porcelainlike compositions as discussed by Kingery et al. in *Introduction to Ceramics, 2nd Edition,* John Wiley and Sons (1984) at page 16.

The particulate material can be any mineral that can be suspended in a slip medium or formed into a ceramic powder and then processed to form non-whiteware ceramic articles such as laboratory ware or ceramics having electronic applications. Non-limiting examples of such minerals include alumina, aluminum nitride, zirconium oxide, mullite, silica, yttrium oxide, spinel, silicon carbide, silicon nitride, titanium dioxide, iron oxide, calcium oxide, boron carbide, boron nitride or mixtures thereof. Preferred minerals include alumina, zirconium oxide, silicon carbide and silicon nitride or mixtures thereof.

The slip medium or liquid used in the preparation of the slip compositions form which the non-whiteware ceramic articles are prepared serves to suspend the particulate material until it can be further processed in the case of casting and pressing manufacturing methods or allow proper mixing as in plastic-forming manufacturing methods. Typically, the slip medium can be organic, inorganic or a mixture thereof. Several slip media are well-known to those skilled in the art of ceramic processing. Examples of slip media include alcohols, ketones, hydrocarbons, chlorinated hydrocarbons and water. A preferred slip medium is water. The particulate material can be employed in any amount which will result in a formed article. Typically, the amount of particulate material employed is from about 5 to about 95 weight percent based on the total weight of the slip. Preferably, the amount of particulate material employed is from about 15 to about 90 weight percent. However, the slip composition can vary widely and can contain more or less of the particulate material. Mixtures of slip media can be employed.

The dispersants useful in the practice of this invention are those known to one skilled in the art of non-whiteware ceramic processing. Typically, the dispersants are polyelectrolytes and comprise a cationic species such as an ammonium or sodium ion on a polymeric carrier. Non-limiting examples of dispersants useful in the practice of this invention include the sodium or ammonium salts of polyacrylates or polyacrylamides. Other useful dispersants include ammonium lignosulfonate and other lignosulfonates.

Additives which are well-known in the art of ceramic processing can also be employed in addition to the particulate material and the slip medium. Non-limiting examples of such additional additives include binders, magnesium carbonate, citric acid and aqueous ammonia as pH modifiers. The nature and amount of the additives used control the characteristics of the slip composition and articles which are prepared therefrom and will be selected by one skilled in the art based on the non-whiteware ceramic articles being produced and the processing method being used.

The slip formulations which are useful in the process of this invention are those formulations useful in the production of non-whiteware ceramic articles such as laboratory ware, refractories, electronic ceramics and articles requiring great wear resistance such as nozzles for sand blasting and lining for coal chutes. These formulations generally lack high green strength. The polyalkylene polyamine additives of this invention are useful in increasing the green strength of the articles prepared from these slip formulations. In a preferred embodiment, the green strength is increased by at least about 5 percent. It is more preferred that the green strength is increased by about 25 percent and most preferred that it is increased by about 50 percent. Green strength can be measured by criteria known to one skilled in the art such as by measurements of modulus of rupture or of compressive strength.

Polyalkylene polyamines are well-known compounds. For the purposes of the present invention, it is preferred to employ a polyalkylene polyamine having an average molecular weight of less than about 1,000, more preferably less than about 800. Examples of polyalkylene polyamines include ethylenediamine, triethylenetetramine, tetraethylenepentamine, pentaethylenehexamine, hexaethyleneheptamine, piperazine, aminoethylpiperazine, propylenediamine, butylenediamine, pentamethylenediamine, hexamethylenediamine, diethylenetriamine, dipropylenetriamine, dibutylenetriamine, bis(pentamethylene)triamine, bis(hexamethylene)triamine, tripropylenetetramine, tris(hexamethylene)tetramine, tetrapropylenepentamine, tetrabutylenepentamine, tetrakis(pentamethylene)pentamine, tetrakis(hexamethylene)pentamine, penetapropylenehexamine, pentabutylenehexamine, pentakis(pentamethylene)hexamine, pentakis(hexamethylene)hexamine, bis(aminopropyl)ethylenediamine, bis(aminopropyl)diethylenetriamine, tris(aminopropyl)ethylenediamine, and the like. The preferred polyalkylene polyamines generally have the formula:

wherein n can be from zero to abut 6, m can be from 1 to about 6, and p can be from 1 to about 15, with the proviso that n and m can vary independently within a molecule from one repeating unit to the next. Preferably, n is zero, p is 1 and m is from about 3 to about 6.

Thus, preferred polyalkylene polyamines for use in the practice of this invention include ethylene polyamines. It is also preferred that the ethylene polyamines used have an average molecular weight greater than about 150 and less than about 800. Examples of preferred polyalkylene polyamines include triethylenetetraamine, tetraethylenepentamine, pentaethylenehexamine, hexaethyleneheptamine and mixtures thereof.

The polyalkylene polyamine additives of this invention may be used individually or mixtures of polyalkylene polyamines may be used. For example, some polyalkylene polyamines such as tetraethylenepentamine (hereinafter TEPA) are generally available commercially only as a mixture of isomers having similar boiling points. Such mixtures are suitable for use in the practice of this invention. In addition to the linear isomers of the polyalkylene polyamines, branched and cyclic isomers of these compounds may also be employed.

The polyalkylene polyamine additive is employed in an amount effective to increase the green strength of prepared articles. It is preferred that the polyalkylene polyamine additive be used in an amount of at least about 0.0001 and no greater than about 2 weight percent based on the solids content of the slip. It is more preferred that the amount of the polyalkylene polyamine used is at least about 0.01 and no greater than about 1.5 weight percent. Most preferably, the amount of the polyalkylene polyamine additive is at least about 0.05 and no greater than about 1.0 weight percent based on the solids content of the slip.

A binder may also optionally be employed in the process of the present invention. The binder serves to maintain viscosity levels in slip compositions and article weight of the non-whiteware ceramic articles prepared therefrom. Non-limiting examples of materials useful as binders include latexes such as styrene-butadiene latexes, acrylic latexes, ethylene-acrylic acid latexes, lignosulfonates, polyvinyl alcohols, alkanolamines, polypropylene glycols, polyethylene glycols and other binders known in the art. The binders may be used individually or mixtures of binders may be employed.

When a binder is employed, it is employed in an amount sufficient to maintain or improve the viscosity of the slip composition and article weight relative to those characteristics in a system which is identical other than the presence of the binder. Preferably, the total amount of binder employed is at least about 0.0001 and no more than about 30 weight percent based on the solids content of the slip. It is more preferred that the total amount of binder employed is at least about 0.01 weight percent and no more than about 6.5 weight percent. Most preferably the amount of binder employed is at least about 0.05 and no greater than about 4.5 weight percent based on the solids content of the slip.

The polyalkylene polyamine and binder may be added to the slip composition separately. Alternatively, all or a portion of the binder may be mixed with the polyalkylene polyamine prior to addition to the slip composition. When the polyalkylene polyamine and all or a portion of the binder are mixed prior to addition to the slip composition, it is preferred to mix the two components by preparing separate aqueous solutions of the binder and the polyalkylene polyamine and adding the amine solution to the binder solution with stirring. When the binder and the polyalkylene polyamine are so mixed, any relative amount of polyalkylene polyamine mixed with binder that will result in an increase in the green strength of articles manufactured by the process of this invention while maintaining the viscosity of the slip and/or the cast weight or the non-whiteware ceramic articles is useful in the practice of this invention. Useful ratios of polyalkylene polyamine to binder, when so mixed, are from about 95:5 to about 5:95 on a weight basis. It is preferred to use a weight ratio of polyalkylene polyamine mixed with binder of about 70:30 to about 30:70 and more preferred to use a weight ratio of about 50:50. It is preferred that the binder mixed with the polyalkylene polyamine additive prior to the addition to the slip is a latex. It is more preferred that the binder mixed with the polyalkylene polyamine is a styrene butadiene latex.

In some applications, additional binder will be employed in the slip composition in conjunction with the polyalkylene polyamine/binder additive. The additional binder added may be the same as or different than the binder mixed with the polyalkylene polyamine prior to the addition of the mixture to the slip composition.

Manufacturing processes used to prepare the non-whiteware ceramic articles prepared using the process and composition of this invention are generally practiced as they would be in the absence of the invention. That is, temperatures, pressures, additives other than the polyalkylene polyamine or polyalkylene polyamine/binder and overall processing methods are not changed in the practice of the current invention.

For example, the slip casting process of the present invention can be practiced using the conditions commonly employed in the art of slip casting and pressing casting. Typically, slip casting is conducted at ambient temperature, although temperatures of from about 5° C. to about 95° C. can be employed if desired. Typically, pressure casting is conducted at temperatures of from about ambient temperature up to about 100° C. or higher. Ambient temperature is preferred from the standpoint of convenience and low cost. Casting can be conducted at superatmospheric pressure, atmospheric pressure, subatmospheric pressure, and combinations of these as is well-known in the casting art.

The casting process of the present invention can be practiced by introduction of the polyalkylene polyamine or the polyalkylene polyamine/binder into the slip. The polyalkylene polyamine and binder, if any, may be added separately or together. Typically, this introduction is made early in the process of slip preparation. The dispersant is also added early in the process of slip preparation. Preferably, the addition to the slip medium of the polyalkylene polyamine and, optionally, the binder occurs prior to addition of the particulate material.

The slip casting techniques employed in the process of the present invention are those which are well-known in the slip casting art. For examples of slip casting methods, see U.S. Pat. Nos. 4,217,320 and 4,482,388, the teaching of which with respect to slip casting are incorporated herein by reference. Additionally, see GB 2,035,189A. Similarly, the pressure casting techniques employed are those which are known in the pressure casting art. See, e.g., U.S. Pat. Nos. 4,591,472 and 4,659,483, the teachings of which with respect to pressure casting are incorporated herein by reference.

In those instances wherein the non-whiteware ceramic articles are prepared by dry pressing, the slip composition of the present invention is prepared and the solvent is removed to yield a powder of the desired consistency. The powder is placed in dies of the appropriate size and shape and subjected to elevated pressures either unilaterally in the case of conventional dry pressing or from all sides in the case of isostatic pressing. Pressures commonly used in uniaxial or isostatic pressing generally range from about 1000 to about 30,000 psi although higher or lower pressures may be used. Pressing is typically conducted at ambient temperatures although elevated temperatures may be used.

When this invention is practiced using plastic-forming manufacturing techniques, the slip is prepared generally as it would be in the absence of the practice of this invention. The polyalkylene polyamine or polyalkylene polyamine/binder additive is added to the slip composition either separately or together. This introduction is typically made early in the process of slip preparation. Preferably, the polyalkylene polyamine and, optionally, the binder are added prior to the addition of the particulate material. The dispersant is also added to the slip composition early in the process of slip preparation. Once the slip is prepared, it is produced using known plastic-forming manufacturing techniques such as extrusion.

Illustrative Embodiments

The following examples are given to illustrate the invention and should not be interpreted as limiting it in any way. Unless stated otherwise, all parts and percentages are given by weight. The procedures described below for slip preparation, casting properties testing and green strength testing were followed in Examples 1–3.

Slip Preparation

A 16-ounce polyethylene bottle containing 10 alumina mixing balls is placed on a top-loading balance and tared. To this bottle are added quantities of the following additives corresponding to their active concentration in the final slip as indicated or shown in Tables I and II: magnesium carbonate ($4MgCo_3.Mg(OH)_2.4H_2O$) 1076 ppm, polyacrylate dispersant (25 percent solution) 1430 ppm, additive solution (50 percent aqueous), and citric acid (as the monohydrate) 1780 ppm. Deionized water is then added until the bottle contains the appropriate quantity of water plus additives (168.8 g total of water plus additives, 21.9 weight percent of total slip). The bottle is removed from the balance, capped and vigorously shaken by hand. Next, 631.2 g of Type A-17 alumina or ceramic grade zirconia is added and the bottle is capped and shaken vigorously until the contents appear uniformly mixed. Any powder that cakes on either the sides or top of the bottle is loosened with a spatula and the bottle is shaken further. The bottle is placed on its side in a mechanical shaker (side to side action) after all ingredients are added and moistened (total 800 g). The bottle is allowed to shake for 2.5 hours at high speed. The slip is 21.1 percent water and water-soluble additives and the remaining 78.9 percent is alumina or zirconia.

Casting Properties Testing

Next, the bottle is removed from the shaker and a portion of the slip is poured into a 4-ounce wide-mouth bottle. The viscosity of the slip is determined using a Brookfield Viscometer (Model LV, spindel 3, RPM 12, 35° C.). The spindle is allowed to rotate a full minute before the reading is taken. A shallow, open plaster of paris mold is used in this test. Slip from the bottles is poured quickly into the mold until the depression is completely full and the slip wells up above the confines of the mold. The slip is allowed to remain in the mold for two minutes and then the mold is tilted and the excess slip is allowed to drain. When the slip draining out of the mold changes from a solid stream to a series of drops at five-second intervals, the mold is returned to the horizontal and replaced on the bench. When the surface of the cast article is no longer glossy, it is removed from the mold after removing any excess that results from the pouring. The cast article is weighed to determine the cast weight.

Green Strength Testing

A portion of the slip not used as described above is poured into a two-part plaster of paris bar mold and is allowed to cast. This bar mold produces ceramic bars which are 0.5 inch×0.5 inch×3.0 inches. When the casting has proceeded sufficiently, the bars are demolded and allowed to dry overnight. Next, the bars are conditioned for six hours at 60° C. followed by 24 hours in an oven at 110° C. When the bars are removed from the oven, they are placed in a desiccator to cool. Twenty-four hours prior to testing, half of the bars are transferred to a constant humidity chamber (50 percent relative humidity - saturated sodium dichromate solution) while the others are left in the desiccator. Modulus of rupture testing is accomplished using an Instron device (Model 1125) with the following setting: 1000-lb load cell, full scale load set to 50 lb, crosshead speed 0.05 in. per minute, and support knives spaced at 1.5 inches. The modulus of rupture for both the anhydrous and 50 percent relative humidity bars is calculated by the standard equation given in ASTM Standard C 689-80.

EXAMPLES 1-2

Effect of Additive on Green Strength in Slip Casting Processes Using Alumina Based Slip

EXAMPLE 1

The procedures specified above are followed using a slip formulation comprising 1000 ppm additive, 78.9 percent alumina, and the other components described above. The identity of the additive is varied in each case. The results obtained are shown in Table I below.

TABLE I

| Additive | Viscosity (cps) | Cast Weight (g) | Anhydrous MOR[1] (psi) | 50% Humidity MOR[1] (psi) |
|---|---|---|---|---|
| None[2] | 2033 | 226 | 23 | 25 |
| EDA[3] | 100 | 56 | 57 | 44 |
| TEPA[4] | 150 | 101 | 67 | 37 |
| TEPA/SB Latex[5] | 900 | 192 | 55 | 34 |

[1] Modulus of rupture
[2] Not an example of this invention
[3] ethylenediamine
[4] tetraethylenepentamine
[5] 50:50 wt basis tetraethylenepentamine/styrene-butadiene latex The data presented above shows that the polyalkylene polyamine additives of this invention are effective in increasing the green strength of articles cast from an alumina slip formulation which in the absence of the additive exhibits a low green strength. In each case, the addition of polyalkylene polyamine additives results in improved green strength of the cast article. When the polyalkylene polyamine is mixed with a latex binder, the improvement in green strength is also observed and, in addition, viscosity and cast weight are maintained.

EXAMPLE 2

The slip formulation described in Example 1 is used in this example. The additive used is a 50:50 blend of tetraethylenepentamine and styrene-butadiene latex. The effect of different additive levels is measured and the results obtained are shown in Table II below.

TABLE II

| Additive Level (ppm) | Viscosity (cps) | Cast Weight (g) | Anhydrous MOR[1] (psi) | 50% Humidity MOR[1] (psi) |
|---|---|---|---|---|
| 0[2] | 2033 | 226 | 23 | 25 |
| 500 | 3850 | 214 | 49 | 25 |
| 1000 | 900 | 192 | 55 | 34 |
| 1500 | 1683 | 207 | 30 | 25 |
| 2000 | 316 | 135 | 50 | 39 |

[1] Modulus of rupture
[2] Not an example of this invention

The data above shows the effect of different levels of a 50:50 blend of tetraethylenepentamine and styrene-butadiene latex on the green strength and cast weight of the cast article. While some improvement in green strength is noted at each dosage level in the case of the anhydrous modulus of rupture, it can be seen that dosage levels of about 1000 ppm result in both a maintained cast article weight and improved green strength both under anhydrous conditions and under 50 percent relative humidity.

EXAMPLE 3

Effect of Additive on Green Strength in Slip Casting Processes Using Zirconia Based Slip The procedure outlined above is followed using zirconia as the particulate in the slip composition and the additives at a level of 1000 ppm specified in Table III below.

TABLE III

| Additive | Viscosity (cps) | Cast Weight (g) | Anhydrous MOR[1] (psi) | 50% Humidity MOR[1] (psi) |
|---|---|---|---|---|
| None[2] | 3925 | 345.1 | 7.42 | 5.24 |
| EDA[3] | 4350 | 342.8 | 10.94 | 3.27 |
| TEPA[4] | 5100 | 318.0 | 18.27 | 6.10 |
| TEPA/SB Latex[5] | 5250 | 336.0 | 11.31 | 5.62 |

[1]Modulus of rupture
[2]Not an example of this invention
[3]ethylenediamine
[4]tetraethylenepentamine
[5]50:50 wt basis tetraethylenepentamine/styrene-butadiene latex The information in Table III above demonstrates that the additives of this invention are effective in increasing the green strength of non-whiteware ceramic articles prepared using a zirconia slip composition processed by slip casting. The information also demonstrates that cast weight and slip viscosity are also maintained with or without the addition of the latex with the polyethylene polyamine additive.

EXAMPLES 4-8 AND COMPARATIVE EXAMPLES C-1 AND C-2

Effect of Additive on Strength of Pressed Articles

To a pint polyethylene bottle containing 5 alumina milling balls is added 600 g of alumina, 300 g, less the grams of binder added, or deionized water, 6 g of ammonium lignosulfonate dispersant, the polyethylene polyamine additive and a high molecular weight polyethylene glycol in the amounts indicated in Table IV. This slip composition is milled 30 minutes and poured into a flat dish. It is then dried for 24 hours at about 50° C. The dried cakes are removed from the dish and ground with a mortar and pestle and then screened through a 60 mesh screen.

The screened powders are pressed into 20-gram pellets using a hydraulic press with pressure of 5000 psi applied for 30 seconds. Oleic acid is used as a die lubricant. Prior to compressive strength testing, the test specimens are conditioned for 24 hours at 50 percent relative humidity. An Instron model TTC is equipped with a 10,000-lb load cell and flat compression plates. The full scale load is set to 2000 lb and a crosshead speed of 0.02 inch per minute is used for the test. Specimens are placed flat side down on the lower plate. The maximum load at failure is recorded and the following equation is used to calculate compressive strength:

$$C = P/A$$

where C is the compressive strength in psi; P is the load at failure on pounds; and A is the area of bearing surface of the specimen tested in square inches. For each example, five specimens were tested and the average was taken and is reported in Table IV below. In some of the examples, the average was of less than five specimens due to delamination of some of the test specimens prior to testing of compressive strength.

TABLE IV

| Example | Additive Concentration[1] (wt %)[2] | Binder Concentration (wt %)[2] | Compressive Strength[3] (psi) |
|---|---|---|---|
| C-1 | none | none | 515[4] |
| 4 | 0.25 | none | 610 |
| 5 | 0.50 | none | 739[5] |
| 6 | 1.00 | none | 831 |
| C-2 | none | 4.0 | 930 |
| 7 | 0.50 | 4.0 | 1266 |
| 8 | 1.00 | 4.0 | 1073 |

[1]In each instance the additive is tetraethylenepentamine
[2]Weight percent based on weight of alumina in slip
[3]Average of five measurements
[4]Average is of only two measurements due to delamination of three of the specimens
[5]Average is of only four specimens due to breaking of one specimen prior to testing The data in the above table demonstrate that the polyethylene polyamine additives of this invention are useful in increasing the green strength of non-whiteware ceramic articles prepared by cold pressing. Further, Examples 4-6 demonstrate the effect of different additive levels. Examples 7 and 8 demonstrate that the additive of this invention used in conjunction with conventional binders results in enhanced green strengths.

EXAMPLES 9-44 AND COMPARATIVE EXAMPLES C-3 TO C-7

Slip Preparation

To a pint polyethylene bottle containing 5 alumina balls are added 3.20 g of a 25 percent solution of a polyacrylate dispersant and 160 g of deionized water. The mixture is thoroughly mixed and then 400 g of alumina is added. When all the powder is thoroughly wetted, the bottle is capped and placed in a mechanical shaker for 30 minutes. At this point, binder in a 30 percent aqueous solution and additive in a 50 percent aqueous solution are added in the amounts indicated in Table V below. The bottle is again capped and returned to the mechanical shaker for an additional two hours. At the end of the two hours, the slip is poured through a 100 mesh sieve into a glass baking dish which is placed in a 50° C. oven for 24 hours. At the end of the 24 hours, the material is allowed to cool and is broken up, pulverized with a mortar and pestle and passed through a 60 mesh sieve.

Compressive Strength and Green Density Testing

Portions of the prepared powder (15 g) are pressed into cylindrical pellets of approximately 1.25 inches in diameter and 0.5 inch in height. The mass, diameter and thickness is precisely determined for each pellet. Then each pellet is diametrally loaded using an Instron (Model 1102) testing machine with the following setting: 1000-pound load cell, full scale load set to 20 pounds, crosshead speed at 0.2 inch per minute. The load at failure is recorded and the green density is calculated as the mass of the pellet divided by the volume of the pellet. The compressive strength is calculated as the load at failure divided by the area of the bearing surface of the test specimen.

EXAMPLES 9-15 AND C-3

Effect of Additive Identity

The procedures described above are followed. No binder is used and the identity of the polyethylene polyamine additive is varied in each example. The amount of additive used in each case is 1 weight percent based on the weight of the alumina. The results obtained are shown in Table V below.

TABLE V

| Example | Additive | Green Density (g/cm³) | Compressive Strength (psi) |
|---|---|---|---|
| C-3 | none | 2.23 | 13.68 |
| 9 | EDA[1] | 2.21 | 19.85 |
| 10 | DETA[2] | 2.26 | 43.86 |
| 11 | TETA[3] | 2.30 | 41.48 |
| 12 | TEPA[4] | 2.30 | 40.25 |
| 13 | E-100[5] | 2.30 | 33.61 |
| 14 | Pip[6] | 2.29 | 29.53 |
| 15 | PA/SB[7] | 2.23 | 32.43 |

[1] ethylenediamine
[2] diethylenetriamine
[3] triethylenetetramine
[4] tetraethylenepentamine
[5] mixture of ethylene polyamines commercially available from The Dow Chemical Company
[6] piperazine
[7] 50/500 weight blend of tetraethylenepentamine and styrene butadiene latex The data in Table V demonstrate that alumina slips containing the polyethylene polyamine additives of this invention are generally effective in increasing the compressive strength and green density of articles prepared by pressing. The effect on green density is small and, in the case of ethylenediamine, is negative. However, in each example the compressive strength of the green ceramic article is increased significantly.

EXAMPLES 16–49 AND C-4 TO C-7

Effect of Binder Amount and Identity

The procedures outlined above are followed. In these examples different binders are used in addition to the polyethylene polyamine additives. The results obtained are shown in Table VI below.

TABLE VI

| Example | Additive Identity | Additive Amount (wt %)[1] | Binder Identity | Binder Amount (wt %)[1] | Green Density (g/cm³) | Compressive Strength (psi) |
|---|---|---|---|---|---|---|
| C-4 | none | — | PEG[9] | 4.0 | 2.23 | 65.61 |
| 16 | EDA[2] | 0.5 | PEG[9] | 4.0 | 2.27 | 46.27 |
| 17 | DETA[3] | 0.5 | PEG[9] | 4.0 | 2.30 | 52.26 |
| 18 | TETA[4] | 0.5 | PEG[9] | 4.0 | 2.31 | 49.94 |
| 19 | TEPA[5] | 0.5 | PEG[9] | 4.0 | 2.28 | 94.58 |
| 20 | E-100[6] | 0.5 | PEG[9] | 4.0 | 2.28 | 75.38 |
| 21 | Pip[7] | 0.5 | PEG[9] | 4.0 | 2.28 | 62.75 |
| 22 | PA/SB[8] | 0.5 | PEG[9] | 4.0 | 2.27 | 63.41 |
| 23 | EDA[2] | 1.0 | PEG[9] | 4.0 | 2.28 | 45.31 |
| 24 | DETA[3] | 1.0 | PEG[9] | 4.0 | 2.29 | 47.30 |
| 25 | TETA[4] | 1.0 | PEG[9] | 4.0 | 2.32 | 89.57 |
| 26 | TEPA[5] | 1.0 | PEG[9] | 4.0 | 2.29 | 139.55 |
| 27 | E-100[6] | 1.0 | PEG[9] | 4.0 | 2.32 | 58.12 |
| 28 | Pip[7] | 1.0 | PEG[9] | 4.0 | 2.27 | 56.48 |
| 29 | PA/SB[8] | 1.0 | PEG[9] | 4.0 | 2.29 | 84.27 |
| C-5 | none | — | PEG[9] | 1.0 | 2.22 | 13.93 |
| 30 | EDA[2] | 1.0 | PEG[9] | 1.0 | 2.23 | 18.82 |
| 31 | DETA[3] | 1.0 | PEG[9] | 1.0 | 2.25 | 25.92 |
| 32 | TETA[4] | 1.0 | PEG[9] | 1.0 | 2.28 | 68.07 |
| 33 | TEPA[5] | 1.0 | PEG[9] | 1.0 | 2.32 | 54.85 |
| 34 | E-100[6] | 1.0 | PEG[9] | 1.0 | 2.28 | 42.28 |
| 35 | Pip[7] | 1.0 | PEG[9] | 1.0 | 2.26 | 29.19 |
| 36 | PA/SB[8] | 1.0 | PEG[9] | 4.0 | 2.26 | 43.76 |
| C-6 | none | — | SB la [10] | 1.00 | 2.19 | 55.36 |
| 37 | EDA[2] | 1.0 | SB la [10] | 1.00 | 2.19 | 53.80 |
| 38 | DETA[3] | 1.0 | SB la [10] | 1.00 | 2.20 | 60.64 |
| 39 | TETA[4] | 1.0 | SB la [10] | 1.00 | 2.22 | 60.81 |
| 40 | TEPA[5] | 1.0 | SB la [10] | 1.00 | 2.26 | 57.10 |
| 41 | E-100[6] | 1.0 | SB la [10] | 1.00 | 2.22 | 58.76 |
| 42 | Pip[7] | 1.0 | SB la [10] | 1.00 | 2.19 | 65.05 |
| 43 | PA/SB[8] | 1.0 | SB la [10] | 0.67 | 2.22 | 61.43 |
| C-7 | none | — | PVA* | 1.0 | 2.21 | 38.35 |
| 44 | EDA[2] | 1.0 | PVA* | 1.0 | 2.21 | 45.16 |
| 45 | DETA[3] | 1.0 | PVA* | 1.0 | 2.23 | 76.01 |
| 46 | TETA[4] | 1.0 | PVA* | 1.0 | 2.25 | 106.52 |
| 47 | TEPA[5] | 1.0 | PVA* | 1.0 | 2.25 | 88.36 |
| 48 | E-100[6] | 1.0 | PVA* | 1.0 | 2.27 | 68.18 |
| 49 | Pip[7] | 1.0 | PVA* | 1.0 | 2.24 | 51.69 |
| 50 | PA/SB[8] | 1.0 | PVA* | 1.0 | 2.23 | 67.12 |

[1] Weight percent based on weight of alumina in slip
[2] Ethylenediamine
[3] Diethylenetriamine
[4] Triethylenetetramine
[5] Tetraethylenepentamine
[6] A blend of polyalkylene polyamines having average molecular weights less than about 800 and greater than about 150
[7] Piperazine
[8] 50/50 weight blend of tetraethylenepentamine and styrene butadiene latex
[9] High molecular weight polyethylene glycol
[10] Styrene-butadiene latex
*Polyvinyl alcohol The data shown above demonstrate the effect of the polyethylene polyamine additives of this invention when used in conjunction with different binders useful in the pressing of non-whiteware ceramic articles. Examples 16–22 and 23–29 demonstrate that the use of 0.5 weight percent or 1.0 weight percent of the polyethylene polyamine additive with 4.0 weight percent of a high molecular weight polyethylene glycol results in increased green density no matter what the identity of the polyethylene polyamine. These examples also demonstrate that compressive strength is increased by the use of higher molecular weight polyethylene polyamines.

Examples 30-36 demonstrate that the use of 1.0 weight percent of the polyethylene polyamine additives of this invention used with 1.0 weight percent of a polyethylene glycol binder is effective to increase both the green density and compressive strength of non-whiteware ceramic articles no matter what the identity of the polyethylene polyamine additive.

Examples 37-43 show that the use of 1.0 weight percent of the polyethylene polyamine additives of this invention used with 1.0 weight percent of a butadiene-styrene latex binder maintains or increases the green density of dry pressed alumina non-whiteware ceramic articles. These examples also demonstrate that the use of higher molecular weight polyethylene polyamine additives is more effective in increasing the compressive strength of dry pressed alumina ceramic articles.

Examples 44-50 demonstrate that the use of 1.0 weight percent of the polyethylene polyamine additives of this invention used with 1.0 weight percent of a polyvinyl alcohol binder is effective to increase both the green density and compressive strength of non-whiteware ceramic articles no matter what the identity of the polyethylene polyamine additive.

EXAMPLES 51-56 AND COMPARATIVE EXAMPLES C-8 TO C-10

Effect of Different Particulate Materials

The procedure outlined for Examples 9-50 is followed with the exception that the nature of the particulate material is varied as is shown in Table VII below. When the powder used is silicon nitride, ethanol is substituted for the deionized water. One weight percent based on the solids content of the slip of additive is used in each of Examples 51-56. Four weight percent of a high molecular weight polyethylene glycol is used as binder in each of the examples. The results obtained are listed in Table VII below.

TABLE VII

| Example | Powder Identity | Additive Identity | Green Density (g/cm$^3$) | Compressive Strength (psi) |
|---|---|---|---|---|
| C-8 | zirconia | none | 3.12 | 13.78 |
| 51 | zirconia | TEPA | 3.33 | 30.33 |
| 52 | zirconia | PA/SB | 3.25 | 51.88 |
| C-9 | silicon carbide | none | 1.87 | 65.09 |
| 53 | silicon carbide | TEPA | 1.86 | 84.57 |
| 54 | silicon carbide | PA/SB | 1.85 | 88.74 |
| C-10 | silicon nitride | none | 1.74 | 34.79 |
| 55 | silicon nitride | TEPA | 1.78 | 46.81 |
| 56 | silicon nitride | PA/SB | 1.78 | 50.04 |

The data in Examples 51-56 shows, when compared to Comparative Examples C-8 to C-10 that the polyethylene polyamine additives of this invention are effective in increasing the compressive strength of non-whiteware ceramic articles prepared by dry pressing techniques when various ceramic powders are used in the slip composition.

What is claimed is:

1. A slip composition essentially free of added elemental sulfur comprising:

(1) a slip medium;
   (2) a dispersant;
   (3) a particulate material selected from the group consisting of alumina, zirconium oxide, silicon carbide, silicon nitride, and mixtures thereof and capable of being processed to form a non-whiteware ceramic article; and
   (4) an additive selected from the group consisting of (1) a polyalkylene polyamine, comprising linear isomers and having an average molecular weight of less than about 1,000, in an amount effective to increase the green strength of non-whiteware ceramic articles prepared from the slip composition; and (2) a mixture of a first component consisting of a polyalkylene polyamine, comprising linear isomers and having an average molecular weight of less than about 1,000, in an amount effective to increase the green strength of non-whiteware ceramic articles prepared from the slip composition and a second component consisting of latexes, lignosulfonates, polyvinyl alcohols, alknaolamines, polypropylene glycols and polyethylene glycols or mixtures thereof in an amount, less than about 6.5 weight percent based on the solid content of the slip, which is effective to maintain the viscosity of the slip and the cast weight of non-whiteware ceramic articles prepared therefrom.

2. The composition of claim 1 wherein the polyalkylene polyamine is an ethylene polyamine having an average molecular weight greater than about 150 and less than about 800 or a mixture of such ethylene polyamines.

3. The composition of claim 1 wherein the polyalkylene polyamine is tetraethylenepentamine.

4. The composition of claim 1 wherein the polyalkylene polyamine is present in an amount of at least about 0.0001 and no greater than about 2 weight percent based on the total solids content of the slip composition.

5. The composition of claim 4 wherein the polyalkylene polyamine is present in an amount of at least about 0.01 and no greater than about 1.5 weight percent based on the total solids content of the slip composition.

6. The composition of claim 5 wherein the polyalkylene polyamine is present in an amount of at least about 0.05 and no greater than about 1.0 weight percent based on the total weight of the slip composition.

7. The slip composition of claim 1 wherein the additive is the mixture of the first and second components.

8. The composition of claim 7 wherein the second component is a styrene-butadiene latex.

9. The composition of claim 7 wherein the weight ratio of first component to second component is at least about 5:95 and no greater than about 95:5.

10. The composition of claim 9 wherein the weight ratio of first component to second component is at least about 30:70 and no greater than about 70:30.

11. The composition of claim 10 wherein the weight ratio of first component to second component is about 50:50.

12. The composition of claim 7 further comprising a binder.

13. The composition of claim 1 further comprising a binder.

14. The composition of claim 1 wherein the additive is the polyalkylene polyamine.

15. A process for the preparation of non-whiteware ceramic articles comprising (a) preparing a slip, which is essentially free of added elemental sulfur, by mixing an additive, in an amount effective to increase the green strength of articles prepared from the slip composition, said additive selected from the group consisting of (1) a polyalkylene polyamine, comprising linear isomers and having an average molecular weight of less than about 1000 and (2) a mixture of a first component consisting of a polyalkylene polyamine, comprising linear isomers and having an average molecular weight of less than about 1,000 and a second component selected from the group consisting of latexes, lignosulfonates, polyvinyl alcohols, alkanolamines, polypropylene glycols and polyethylene glycols or mixtures thereof in an amount, less than about 6.5 weight percent based on the solids contents of the slip, which is effective to maintain the viscosity of the slip and the cast weight of non-whiteware ceramic articles prepared therefrom, in an amount effective to increase the green strength of articles prepared from the slip composition with a slip medium and a dispersant;

(b) mixing a particulate material selected from the group consisting of alumina, zirconium oxide, silicon carbide, silicon nitride, and mixtures thereof with the mixture of step (a) to form the slip; and (c) using slip casting, pressure casting, pressing, or plastic-forming techniques to prepare non-whiteware ceramic articles from the mixture of step (b).

16. The process of claim 15 wherein the non-whiteware ceramic articles are prepared by slip casting.

17. The process of claim 15 wherein the non-whiteware ceramic articles are prepared by pressure casting.

18. The process of claim 15 wherein the non-whiteware ceramic articles are prepared by pressing.

19. The process of claim 18 wherein the non-whiteware ceramic articles are prepared by isostatic pressing.

20. The process of claim 15 wherein the non-whiteware ceramic articles are prepared by plastic-forming techniques.

21. The process of claim 15 wherein the green strength of the non-whiteware ceramic articles is increased by at least about five percent.

* * * * *